US010207550B2

(12) United States Patent
Knapke et al.

(10) Patent No.: US 10,207,550 B2
(45) Date of Patent: Feb. 19, 2019

(54) ROTARY JOINT ASSEMBLY

(71) Applicant: DANA HEAVY VEHICLE SYSTEMS GROUP, LLC, Maumee, OH (US)

(72) Inventors: Brian V. Knapke, Toledo, OH (US); Lloyd G. Racine, Lamoure, ND (US)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 208 days.

(21) Appl. No.: 15/318,734

(22) PCT Filed: Jun. 19, 2015

(86) PCT No.: PCT/US2015/036554
§ 371 (c)(1),
(2) Date: Dec. 14, 2016

(87) PCT Pub. No.: WO2015/195998
PCT Pub. Date: Dec. 23, 2015

(65) Prior Publication Data
US 2017/0129293 A1    May 11, 2017

Related U.S. Application Data

(60) Provisional application No. 62/014,822, filed on Jun. 20, 2014.

(51) Int. Cl.
*B60C 23/00* (2006.01)
*F16J 15/3236* (2016.01)
*F16J 15/34* (2006.01)

(52) U.S. Cl.
CPC ......... *B60C 23/003* (2013.01); *F16J 15/3236* (2013.01); *F16J 15/3456* (2013.01)

(58) Field of Classification Search
CPC .. B60C 23/003; F16J 15/3456; F16J 15/3236; F16J 15/16

(Continued)

(56) References Cited

U.S. PATENT DOCUMENTS 3,625,251 A    12/1971   Nelson
3,788,653 A    1/1974    Sigmon
(Continued)

FOREIGN PATENT DOCUMENTS

DE    102012105088 A1    12/2013
FR    2874671 A1         3/2006
JP    H0414243 Y2        3/1992

OTHER PUBLICATIONS

The International Search Report and Written Opinion issued in PCT/US2015/036554, dated Sep. 14, 2015, 8 pages, European Patent Office, Rijswijk, Netherlands.

*Primary Examiner* — S. Joseph Morano
*Assistant Examiner* — Jean W Charleston
(74) *Attorney, Agent, or Firm* — Marshall & Melhorn, LLC

(57) ABSTRACT

A rotary joint assembly including a rotating portion. The rotating portion includes an annular body and a pair of annular sealing members. Each annular sealing member of the pair of annular sealing members is attached to a side of the annular body. An air passageway is formed in the annular body. The rotary joint assembly also includes a non-rotating portion. The non-rotating portion has a non-rotating portion air passageway formed therein. The non-rotating portion air passageway is in fluid communication with the air passageway formed in the annular body. A pair of annular air seal members are provided between the rotating portion and the non-rotating portion. Each annular air seal member of the pair of annular air seal members contacts a sealing surface of one of the annular seal members to provide a seal around an interface between the air passageway formed in the annular body and the non-rotating portion air passageway.

20 Claims, 6 Drawing Sheets

(58) Field of Classification Search
USPC .................................. 152/415, 416, 417
See application file for complete search history.

(56) References Cited

U.S. PATENT DOCUMENTS

| | | | |
|---|---|---|---|
| 4,058,321 A | 11/1977 | Gavrun et al. | |
| 4,373,622 A | 2/1983 | Michael | |
| 4,441,539 A | 4/1984 | Hulse | |
| 4,596,054 A | 6/1986 | MacKendrick et al. | |
| 4,693,699 A | 9/1987 | Gregerson | |
| 4,733,707 A | 3/1988 | Goodell et al. | |
| 4,804,027 A | 2/1989 | Runels | |
| 4,834,228 A | 5/1989 | Horsch | |
| 4,925,219 A | 5/1990 | Pollack et al. | |
| 5,018,749 A | 5/1991 | Forch | |
| 5,240,039 A | 8/1993 | Colussi et al. | |
| 5,482,135 A | 1/1996 | Phillips et al. | |
| 5,509,697 A | 4/1996 | Phillips et al. | |
| 6,098,682 A | 8/2000 | Kis | |
| 6,144,295 A | 11/2000 | Adams et al. | |
| 6,145,558 A | 11/2000 | Schmitz | |
| 6,439,044 B1* | 8/2002 | Tigges .................. | B60C 23/003 73/146.2 |
| 6,779,618 B2 | 8/2004 | Tarasinski | |
| 6,857,457 B2 | 2/2005 | Nienhaus | |
| 7,051,777 B2 | 5/2006 | Tarasinski et al. | |
| 7,219,540 B2 | 5/2007 | Nordhoff | |
| 7,302,837 B2 | 12/2007 | Wendte | |
| 7,370,865 B2 | 5/2008 | Vik et al. | |
| 7,555,903 B2 | 7/2009 | Tarasinski et al. | |
| 7,931,061 B2 | 4/2011 | Gonska et al. | |
| 8,186,393 B2 | 5/2012 | Huegerich et al. | |
| 8,397,774 B2 | 3/2013 | Gonska et al. | |
| 8,783,314 B2 | 7/2014 | Tigges | |
| 9,126,460 B2* | 9/2015 | Knapke .................. | B60B 35/00 |
| 9,248,705 B2 | 2/2016 | Brenninger et al. | |
| 9,352,622 B2 | 5/2016 | Tigges | |
| 9,435,437 B2 | 9/2016 | Tajan | |
| 2006/0022411 A1 | 2/2006 | Beardsley et al. | |
| 2009/0108541 A1 | 4/2009 | Beardsley et al. | |
| 2009/0211682 A1 | 8/2009 | Sobotzik | |
| 2009/0250882 A1 | 10/2009 | Sampson | |
| 2013/0112327 A1 | 5/2013 | Tigges | |
| 2013/0167975 A1 | 7/2013 | Tigges | |
| 2013/0284281 A1 | 10/2013 | Brenninger et al. | |
| 2014/0028016 A1* | 1/2014 | Knapke .................. | B60C 23/003 285/98 |
| 2014/0062031 A1 | 3/2014 | Honzek et al. | |
| 2014/0183826 A1 | 7/2014 | Tajan | |

* cited by examiner

ROTARY JOINT ASSEMBLY

CROSS-REFERENCE TO RELATED APPLICATION

This application is claiming the benefit, under 35 U.S. C. 119(e), of the provisional U.S. patent application which was granted Ser. No. 62/014,822 and filed on Jun. 20, 2014, the entire disclosure of which is hereby incorporated by reference.

BACKGROUND OF THE INVENTION

This invention relates to a rotary joint assembly. In particular, this invention relates to a rotary joint assembly for a tire inflation system.

Central tire inflation systems for vehicles are well-known and are used to allow the operator to measure and adjust the tire pressure which provides a vehicle with versatility for differing terrain types and reduces maintenance requirements. For example, the tire pressure of a wheel assembly in fluid communication with the tire inflation system may be lowered to provide additional traction for the vehicle or may be raised to reduce the rolling resistance of the vehicle. Rotary joints are used in tire inflation systems to enable fluid communication between a non-rotating component and a rotating component.

Rotary joints known in the art are limited by misalignment of the non-rotating component and the rotating component. Accordingly, it would be desirable to provide an improved rotary joint assembly that overcomes the deficiencies of the known designs and provide an improved rotary joint assembly.

BRIEF SUMMARY OF THE INVENTION

Embodiments of a rotary joint assembly are provided.

In an embodiment, the rotary joint assembly comprises a rotating portion. The rotating portion comprises an annular body and a pair of annular sealing members. Each annular sealing member of the pair of annular sealing members is attached to a side of the annular body. An air passageway is formed in the annular body. A non-rotating portion has a non-rotating portion air passageway formed therein. The non-rotating portion air passageway is in fluid communication with the air passageway formed in the annular body. A pair of annular air seal members are provided between the rotating portion and the non-rotating portion. Each annular air seal member of the pair of annular air seal members contacts a sealing surface of one of the annular sealing members to provide a seal around an interface between the air passageway formed in the annular body and the non-rotating portion air passageway.

In another embodiment, a rotary joint assembly for a steerable axle is provided. The rotary joint assembly comprises a rotating portion. The rotating portion is attached to a hub flange via a torque plate. The rotating portion comprises an annular body and a pair of annular sealing members. Each annular sealing member of the pair of annular sealing members is attached to a side of the annular body. An air passageway is formed in the annular body. The rotary joint assembly also comprises a non-rotating portion attached to a knuckle flange. The non-rotating portion has a non-rotating portion air passageway formed therein. The non-rotating portion air passageway is in fluid communication with the air passageway formed in the annular body. A pair of annular air seal members are provided between the rotating portion and the non-rotating portion. Each annular air seal member of the pair of annular air seal members contacts a sealing surface of one of the annular sealing members to provide a seal around an interface between the air passageway formed in the annular body and the non-rotating portion air passageway. A pair of outer annular seal members are provided between the rotating portion and the non-rotating portion. Each of the outer annular seal members of the pair of outer annular seal members is positioned radially between one of the annular air seal members and an outer end of the rotating portion and contacts one of the sealing surfaces of one of the annular sealing members. A pair of axial spacer members are provided between the rotating portion and the non-rotating portion. The axial spacer members are provided on opposite sides of the rotating portion. Each axial spacer member of the pair of axial spacer members separates one of the annular air seal members from one of the outer annular seal members.

DETAILED DESCRIPTION OF THE INVENTION

Figure 1:
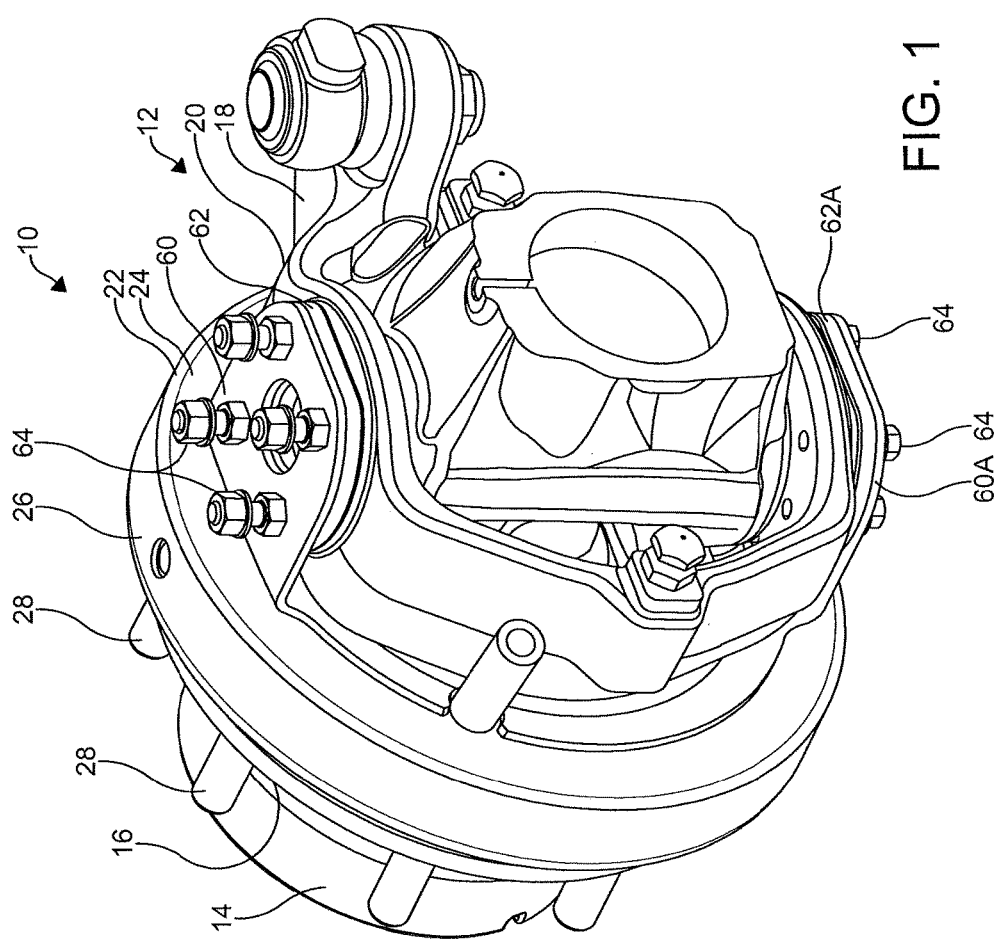
FIG. 1 is a partial perspective view of a steerable axle and a perspective view of an embodiment of a rotary joint assembly in accordance with the invention.

It is to be understood that the invention may assume various alternative orientations and step sequences, except where expressly specified to the contrary. It is also to be understood that the specific assemblies and processes illustrated in the attached drawings, and described in the following specification are simply exemplary embodiments of the inventive concepts. Hence, specific dimensions, directions, or other physical characteristics relating to the embodiments disclosed are not to be considered as limiting, unless expressly stated otherwise. Also, although they may not be, like elements in various embodiments may be commonly referred to with like reference numerals within this section of the application.

A rotary joint assembly 10 is described herein. The rotary joint assembly 10 will be described in connection with a central tire inflation system. The central tire inflation system and rotary joint assembly 10 may have applications to passenger, commercial and off-highway vehicles such as, for example, tractors and military vehicles. The rotary joint assembly 10 could also have industrial, locomotive, and aerospace applications.

The rotary joint assembly 10 will be described for use in transferring a pressurized fluid from a rotating portion of the tire inflation system to a non-rotating portion of the tire inflation system and vice versa. Preferably, the pressurized fluid is air. However, it should be appreciated that other pressurized fluids may be suitable for use with the rotary joint assembly.

Referring now to FIG. 1, the rotary joint assembly 10 is suitable for use with, for example, a steerable axle 12. The steerable axle 12 may be driven or non-driven. In an embodiment, the rotary joint assembly 10 is a generally annular member. The rotary joint assembly 10 is attached to the steerable axle 12 in such a manner that it is positioned around and surrounds a portion of a hub 14. Preferably, the hub 14 is configured to support a wheel assembly (not depicted).

In an embodiment, the rotary joint assembly 10 is provided between a hub flange 16 and a portion of the chassis. As illustrated in FIG. 1, the rotary joint assembly 10 may be provided between the hub flange 16 and a knuckle 18. In this embodiment, the rotary joint assembly 10 separates the hub flange 16 from a knuckle ring 20.

The rotary joint assembly 10 comprises a rotating portion 22 and a non-rotating portion 24. In an embodiment, the rotating portion 22 is attached to the hub flange 16 for rotation therewith. The non-rotating portion 24 is attached to a non-rotating portion of the vehicle such as, for example, the chassis. For example, as shown in FIG. 1, the non-rotating portion 24 may be attached to the knuckle ring 20 or another portion of the knuckle 18.

Referring now to FIGS. 1-4, a torque plate 26 is utilized to attach the rotating portion 22 to the hub flange 16. The torque plate 26 is attached to the hub flange 16 by one or more hub fasteners 28. In an embodiment, the torque plate 26 is generally annular.

The torque plate 26 comprises an attaching portion 30. The attaching portion 30 extends circumferentially about an axis of rotation 32 of the rotary joint assembly 10. The attaching portion 30 is a generally annular portion which is attached to the hub flange 16. The attaching portion 30 is oriented in a parallel relationship with the hub flange 16. Preferably, an outboard surface 34 of the attaching portion 30 abuts the hub flange 16. A plurality of circumferentially spaced openings 36 are provided in the attaching portion 30. A hub fastener 28 extends through each opening 36 to attach the torque plate 26 to the hub flange 16. The attaching portion 30 is spaced apart from and oriented in a parallel relationship with an outboard wall portion 40 of the non-rotating portion 24. A space 42 separates an inboard surface 44 of the attaching portion 30 from an outboard surface 46 of the outboard wall portion 40.

Figure 6:
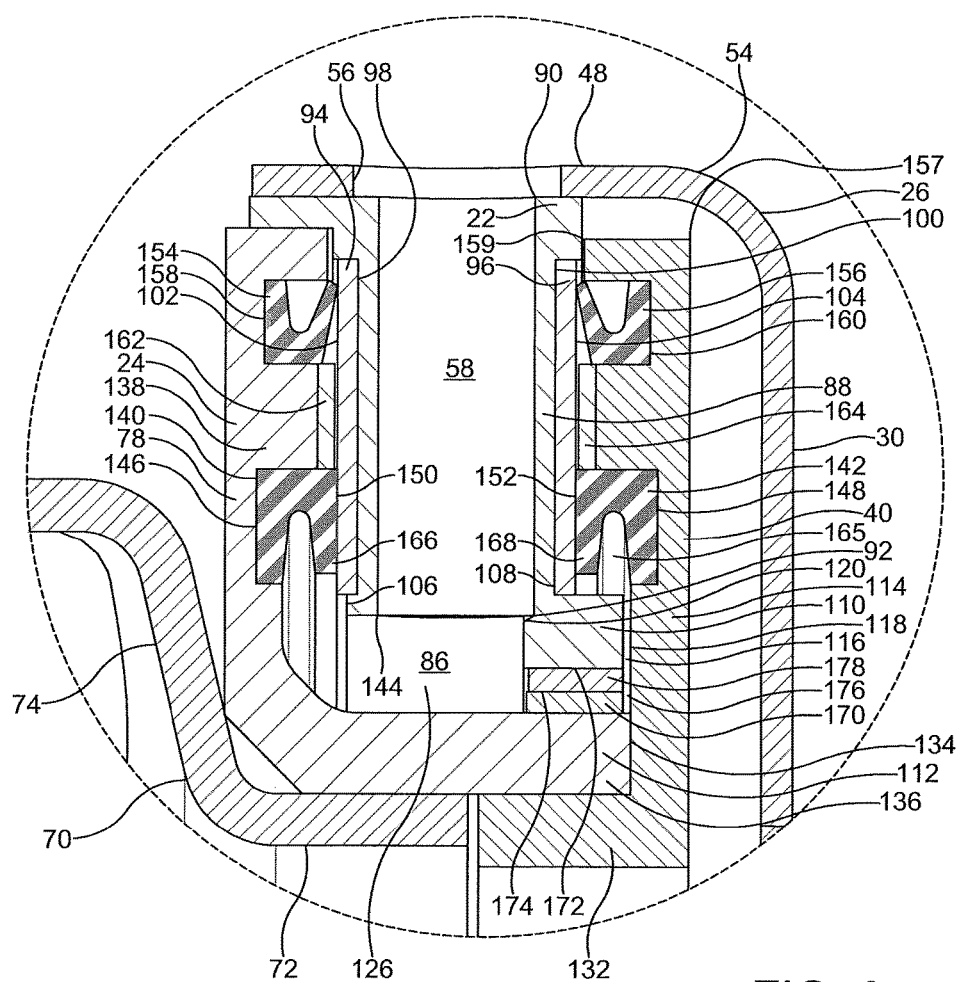
FIG. 6 is an enlarged view of a portion of the rotary joint assembly of FIG. 4.

The torque plate 26 also comprises an axially extending portion 48. An inner surface 50 of the axially extending portion 48 is attached to the rotating portion 22. More particularly, the inner surface 50 of the axially extending portion 48 is attached to an outer surface 52 of the rotating portion 22. Also, the axially extending portion 48 is attached to the attaching portion 30 via a curved portion 54. The axially extending portion 48 is in a perpendicular relationship with the attaching portion 30. Referring now to FIG. 6, an air passageway aperture 56 is formed in the axially extending portion 48. The aperture 56 and an air passageway 58 in the rotating portion 22 are aligned to enable fluid communication between a tire (not depicted), a wheel valve (not depicted), or another portion of the tire inflation system (not depicted) and the air passageway 58.

Referring back to FIGS. 1-4, the non-rotating portion 24 is attached to a knuckle flange 62 via a mounting plate 60. The torque plate 26 and mounting plate 60 help to distribute torque evenly to the rotating portion 22 and non-rotating portion 24, respectively, to limit the radial load experienced by certain portions 94, 96, 162, 164, 178 of the rotary joint assembly 10. As illustrated best in FIGS. 1-2 and in an embodiment, the rotary joint assembly 10 may comprise a pair of mounting plates 60, 60A. Each mounting plate 60, 60A is attached to a knuckle flange 62, 62A. The knuckle flanges 62, 62A are outwardly facing and are disposed on opposed sides of the knuckle ring 20. Each mounting plate 60, 60A is oriented in a parallel relationship with the knuckle flange 62, 62A it is attached to. Each mounting plate 60, 60A is secured to the knuckle flange 62, 62A by one or more fasteners 64. Each fastener 64 is disposed in a fastener hole 66, 66A. The fastener holes 66, 66A are formed through the mounting plates 60, 60A, respectively. Each mounting plate 60, 60A also comprises a center hole 68, 68A. The center holes 68, 68A are aligned with each other and are provided on opposed sides of the knuckle 18.

Figure 2:
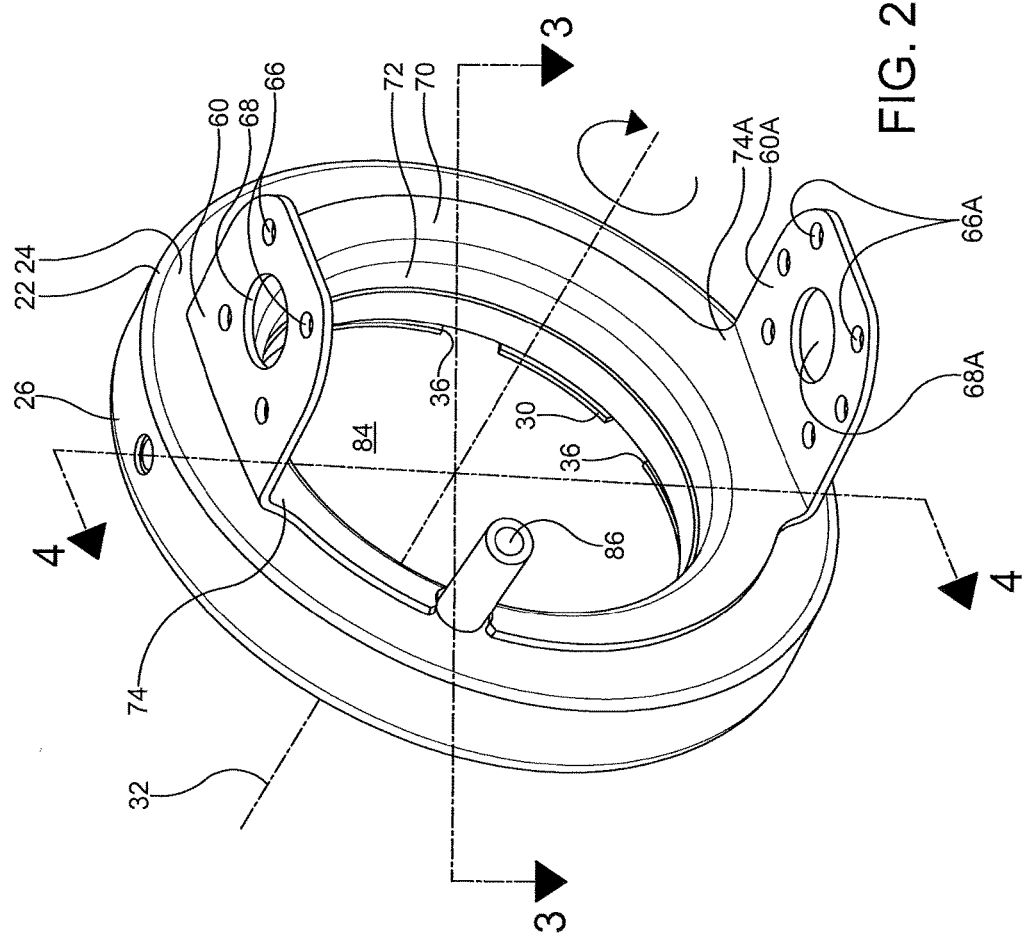
FIG. 2 is a perspective view of the rotary joint assembly of FIG. 1.
Figure 3:
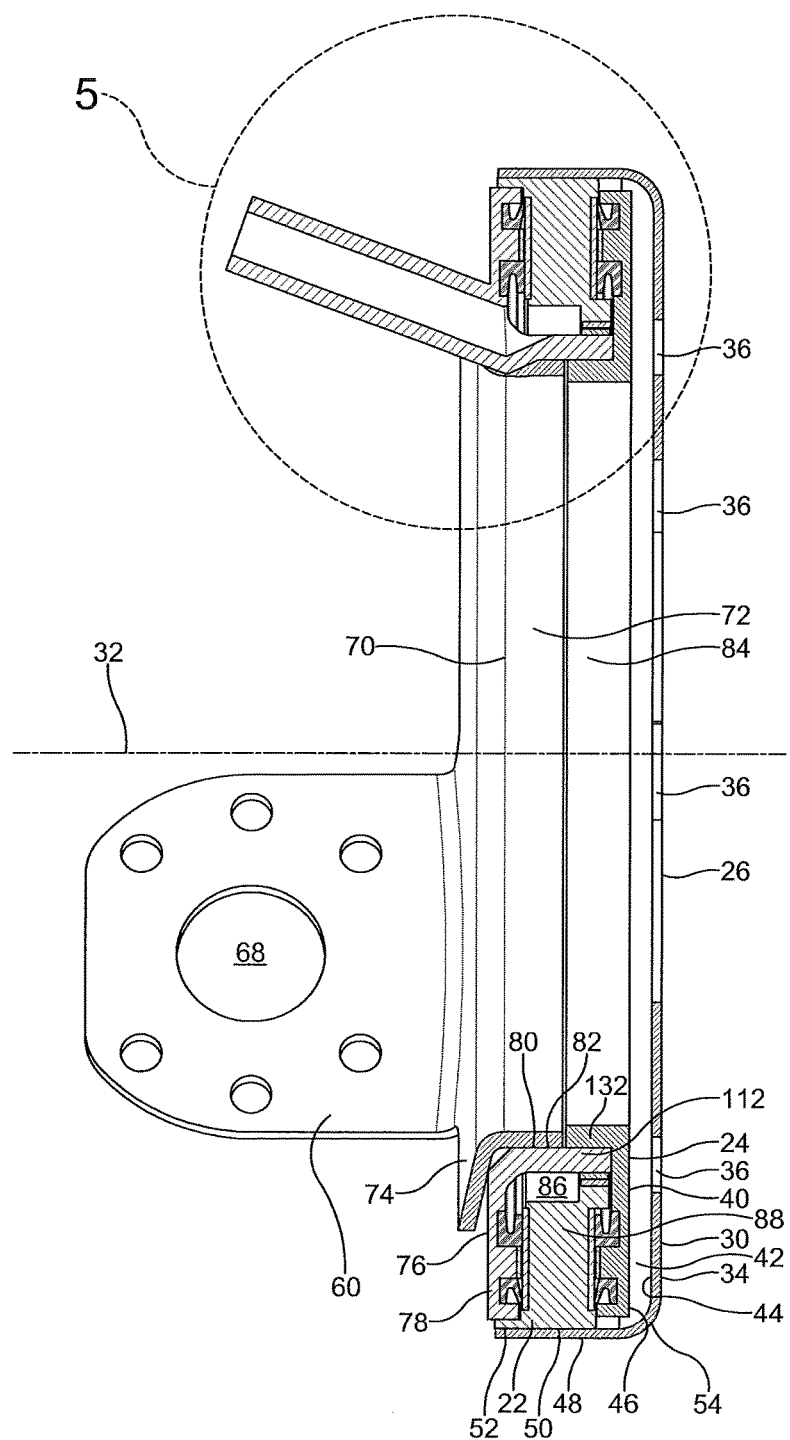
FIG. 3 is a cross-sectional view of the rotary joint assembly of FIG. 2 taken along line 3-3.
Figure 4:
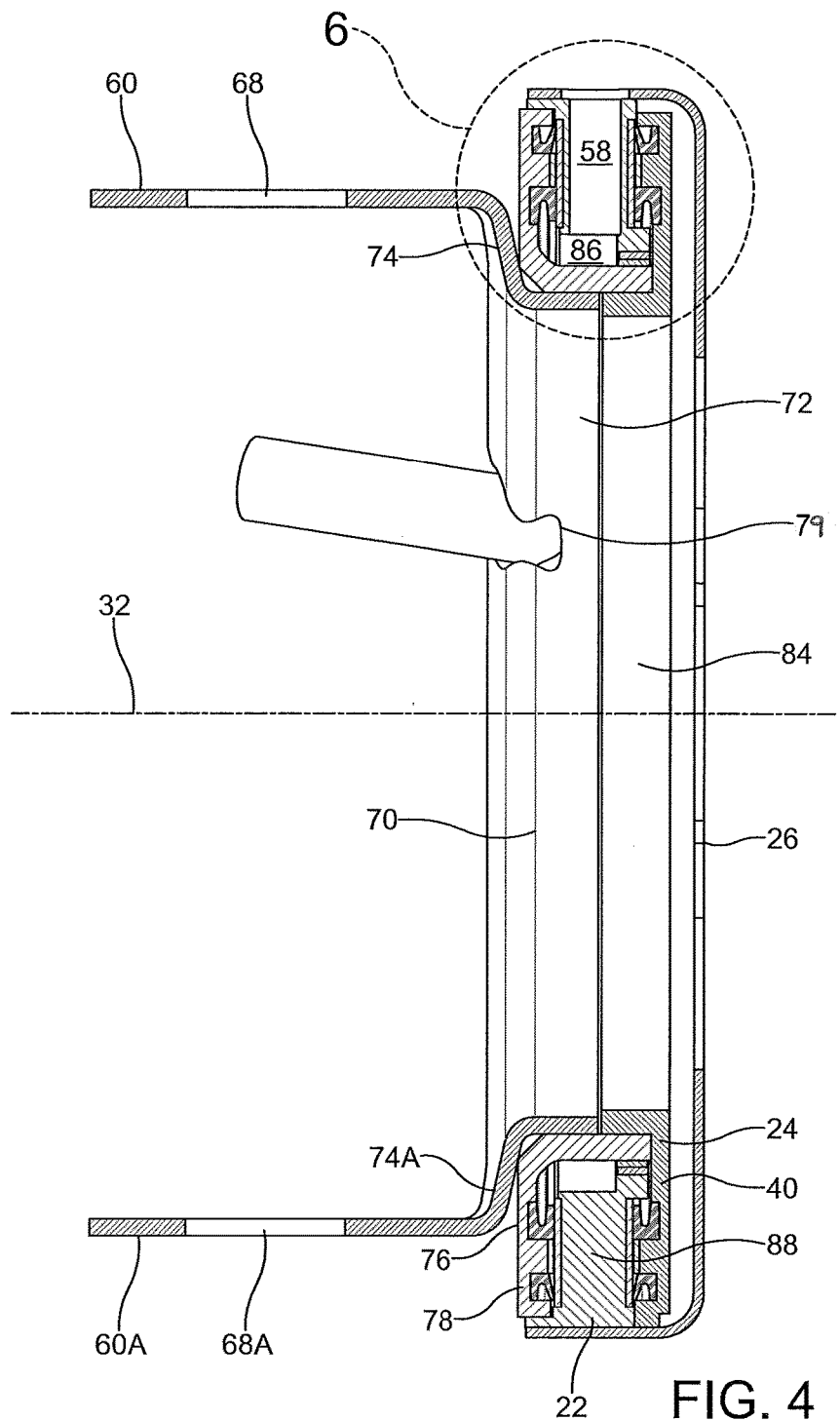
FIG. 4 is a cross-sectional view of the rotary joint assembly of FIG. 2 taken along line 4-4.
Figure 5:
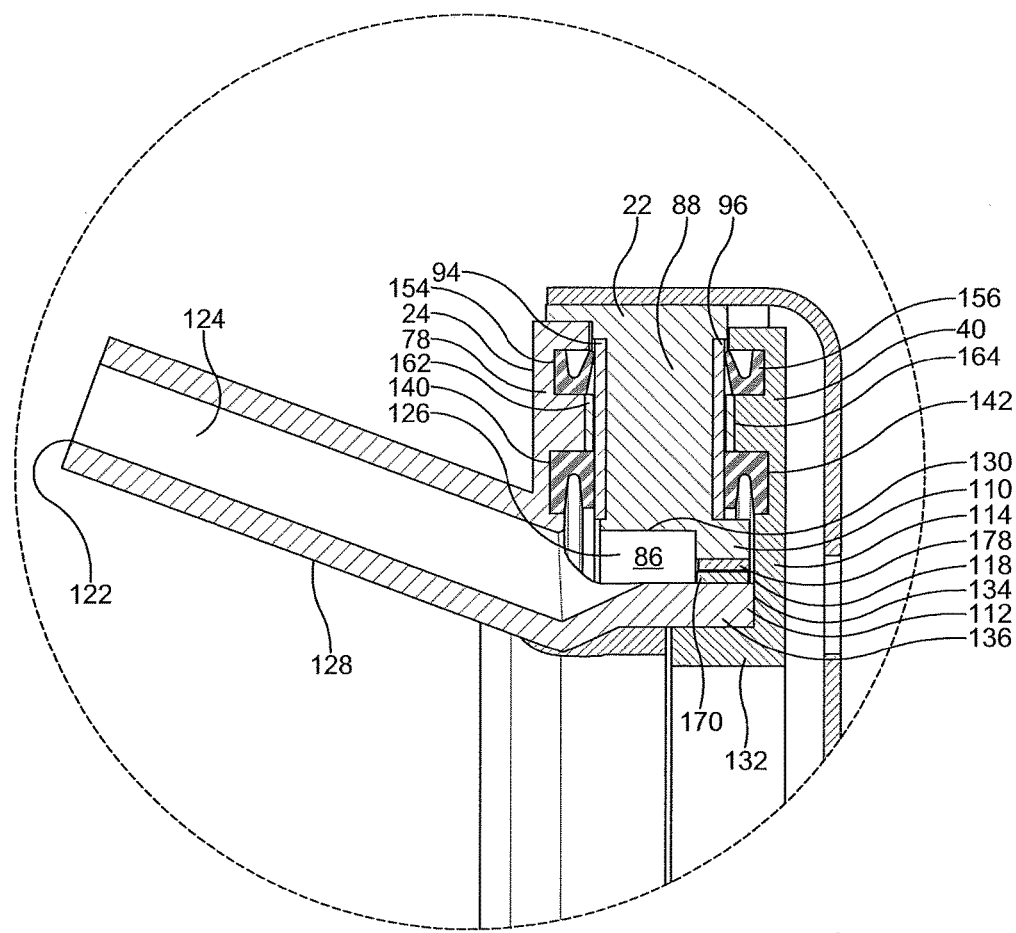
FIG. 5 is an enlarged view of a portion of the rotary joint assembly of FIG. 3.

Referring now to FIGS. 2-4, a generally ring-shaped member 70 is attached to each mounting plate 60, 60A on an end and the non-rotating portion 24 on another end. The generally ring-shaped member 70 comprises an inner ring 72 and a pair of radially extending arms 74, 74A. Each arm 74, 74A is attached to a mounting plate 60, 60A. Each arm 74, 74A may be of a general L-shape or S-shape in cross-section. Each arm 74, 74A abuts a portion of an inboard surface 76 of an inboard wall portion 78 of the non-rotating portion 24. The inner ring 72 is oriented in a perpendicular relationship with a portion 138 of the inboard wall portion 78. Also, the inner ring 72 is oriented in a parallel relationship with a portion 112 of the inboard wall portion 78. An outer surface 80 of the inner ring 72 is attached to an inner surface 82 of the inboard wall portion 78. A non-rotating portion air passageway aperture 79 is provided through the inner ring 72.

As best illustrated in FIGS. 2-6, the rotating portion 22 is a generally annular member. The rotating portion 22 is disposed between the inboard wall portion 78 and the outboard wall portion 40. As noted above, the rotating portion 22 rotates about the axis of rotation 32. The axis of rotation 32 extends through a central opening 84 in the rotary joint assembly 10. In an embodiment, the central opening 84 is at least partially defined by the inner ring 72 of the ring-shaped member 70. In embodiments where the steerable axle is driven (not depicted), the axis of rotation may be aligned with an axis of rotation of an axle.

As noted above, the rotating portion air passageway 58 is in fluid communication with the tire, the wheel valve, or another portion of the tire inflation system on an end 90. On an opposite end 92, the air passageway 58 is in fluid communication with an air passageway 86 provided in the non-rotating portion 24. The rotating portion air passageway 58 may rotate relative to the non-rotating portion air passageway 86.

In an embodiment, the rotating portion air passageway 58 is of a cylindrical shape. Preferably, the air passageway 58 extends from the outer surface 52 to an inner surface 130 of the rotating portion 22 and is in a perpendicular relationship with the axis of rotation 32. However, in certain embodiments (not depicted), the air passageway 58 may be provided at an oblique angle relative to the axis of rotation 32. The air passageway 58 is formed in an annular body 88 of the rotating portion 22. The annular body 88 is thicker around the ends 90, 92 of the air passageway 58.

The air passageway 58 is positioned between a pair of annular sealing members 94, 96. The annular sealing members 94, 96 are provided on and attached to opposite sides of the annular body 88. Preferably, the annular sealing members 94, 96 are disposed in separate grooves 98, 100 formed in the annular body 88. The annular sealing members 94, 96 are provided in a parallel relationship with each other and circumferentially about the axis of rotation 32. The annular sealing members 94, 96 can be formed from any suitable material. Suitable materials include metals and other wear resistant, low friction materials. For example, the annular sealing members 94, 96 can be formed from oil impregnated metals, powdered metal(s), bronze, nickel, tin plated metals and the like. Alternatively, the annular sealing members 94, 96 can be formed from other wear resistant, low friction non-metals or plastics such as, for example, PTFE loaded thermoplastics and other like materials.

Each annular sealing member 94, 96 comprises a sealing surface 102, 104. Each sealing surface 102, 104 abuts certain portions 140, 142, 154, 156, 162, 164 of the rotary joint assembly 10. As illustrated best in FIG. 6, each sealing surface 102, 104 is of a rectangular shape in cross-section.

In an embodiment, the first annular sealing member 94 is disposed in an annular groove 98 formed in an inboard facing surface 106 of the rotating portion 22. The second annular sealing member 96 is disposed in an annular groove 100 formed in an outboard facing surface 108 of the rotating portion 22. In this embodiment, the sealing surface 102 of the first annular sealing member 94 is in a parallel relationship with the inboard facing surface 106 of the rotating portion 22 and the sealing surface 104 of the second annular sealing member 96 is in a parallel relationship with the outboard facing surface 108 of the rotating portion 22.

A first spacer member 110 is attached to the annular body 88. The first spacer member 110 may be formed in a unitary manner with the annular body 88. In an embodiment, the first spacer member 110 is an annular member. The first spacer member 110 extends radially from the annular body 88 toward the axis of rotation 32 and an axially extending portion 112 of the inboard wall portion 78. The first spacer member 110 also extends axially from the annular body 88 toward a radially extending portion 114 of the outboard wall portion 40. A space 116 separates the first spacer member 110 from an inboard surface 118 of the radially extending portion 114.

The air passageway 86 provided in the non-rotating portion 24 is in fluid communication with the air passageway 58 in the rotating portion 22 on an end 120 thereof and a control unit (not depicted) and/or another portion of the tire inflation system such as, for example, a valve member (not depicted) or a source of pressurized air (not depicted) on an opposite end 122 thereof. The non-rotating portion air passageway 86 is stationary with respect to the air passageway 58 formed in the rotating portion 22.

The non-rotating portion air passageway 86 comprises a first portion 124 and a second portion 126. The first portion 124 may be of a generally cylindrical shape and defined by a tube portion 128. The tube portion 128 extends through the non-rotating portion air passageway aperture 79 provided through the inner ring 72. Preferably, the tube portion 128 is formed in a unitary manner with the inboard wall portion 78. Within the tube portion 128, the first portion 124 of the air passageway 86 is provided at an oblique angle relative to the axis of rotation 32. The first portion 124 of the air passageway 86 is in fluid communication with another portion of the tire inflation system on an end thereof. On an opposite end, the first portion 124 of the air passageway 86 is in fluid communication with the second portion 126 of the air passageway 86. The second portion 126 of the air passageway 86 is of an annular shape and is positioned between the axially extending portion 112 of the inboard wall portion 78 and the inner surface 130 of the rotating portion 22. The second portion 126 is also in fluid communication with the air passageway 58 provided in the rotating portion 22.

Preferably, the non-rotating portion 24 is formed from the outboard wall portion 40 and the inboard wall portion 78. The outboard wall portion 40 and the inboard wall portion 78 are separate annular bodies that are secured together. To secure the outboard wall portion 40 and the inboard wall portion 78 together, the axially extending portion 112 of the inboard wall portion 78 overlaps an axially extending portion 132 of the outboard wall portion 40. In this embodiment, the axially extending portion 112 of the inboard wall portion 78 is provided radially out from the axially extending portion 132 of the outboard wall portion 40. In an embodiment, the central opening 84 is at least partially defined by the axially extending portion 132 of the outboard wall portion 40. Thus, in certain embodiments, the axially extending portion 132 of the outboard wall portion 40 forms the innermost surface of the non-rotating portion 24. The axially extending portion 112 of the inboard wall portion 78 can be secured to the outboard wall portion 40 via a weld, interference fit, an adhesive or another method known in the art.

The axially extending portion 112 of the inboard wall portion 78 extends toward the radially extending portion 114 of the outboard wall portion 40. When secured to the outboard wall portion 40, an end surface 134 of the axially extending portion 112 of the inboard wall portion 78 abuts the inboard surface 118 of the radially extending portion 114. The end surface 134 is provided as a portion of an end portion 136 of the axially extending portion 112 of the inboard wall portion 78. The end portion 136 is provided in a parallel spaced apart relationship with the first spacer member 110.

The radially extending portion 114 of the outboard wall portion 40 is in a parallel spaced apart relationship with a radially extending portion 138 of the inboard wall portion 78. The rotating portion 22 is disposed between the radially extending portion 114 of the outboard wall portion and the radially extending portion 138 of the inboard wall portion. The inboard facing surface 106 of the rotating portion 22 faces the inboard wall portion 78 and the outboard facing surface 108 of the rotating portion 22 faces the outboard wall portion 40. In an embodiment, the inboard facing surface 106 is in a spaced apart and parallel relationship with the inboard wall portion 78 and the outboard facing surface 108 is in a spaced apart and parallel relationship with the outboard wall portion 40.

A pair of annular air seal members 140, 142 are provided between the rotating portion 22 and non-rotating portion 24. Each annular air seal member 140, 142 sealingly contacts a sealing surface 102, 104 of one of the annular sealing members 94, 96 to provide a seal around an interface 144 of the air passageways 58, 86. Preferably, the seal is fluid tight and positioned radially out from the interface 144 of the air passageways 58, 86.

The annular air seal members 140, 142 are disposed in separate grooves 146, 148 formed in the outboard wall portion 40 and the inboard wall portion 78. Preferably, the annular air seal members 140, 142 are V-shaped and formed from a resilient material. Also, it is preferred that the air seal members 140, 142 are wear resistant. In an embodiment, a seal surface 150, 152 of each air seal member 140, 142 has a wear resistant, low friction material disposed thereon to reduce friction between the seal members 140, 142 and the sealing surfaces 102, 104 of the annular sealing members 94, 96. Suitable low friction materials include plastics such as, for example, a PTFE loaded thermoplastic and other like materials.

A pair of outer annular seal members 154, 156 are also disposed between the rotating portion 22 and non-rotating portion 24. The outer annular seal members 154, 156 are positioned radially out from the air seal members 140, 142. In an embodiment, the outer annular seal members 154, 156 are positioned radially between the air seal members 140, 142 and an outer end 157 of the non-rotating portion 24. The outer annular seal members 154, 156 are disposed in grooves 158, 160 formed in the non-rotating portion 24 and contact one of the sealing surfaces 102, 104 of the annular sealing members 94, 96 to prevent dirt and debris from passing between an interface 159 between the rotating portion 22 and non-rotating portion 24.

A pair of axial spacer members 162, 164 are provided between the rotating portion 22 and the non-rotating portion 24. Preferably, each axial spacing member 162, 164 comprises a wear resistant, low friction material to reduce the friction between the member 162, 164 and the rotating portion 22. Suitable wear resistant, low friction materials include plastics such as, for example, a PTFE loaded thermoplastic and other like materials. In an embodiment, the axial spacer members 162, 164 may each be a coating formed from such a material and provided in a generally annular shape or be of another suitable ring-shaped member having a rectangular-shape in cross-section.

The axial spacer members 162, 164 are provided in a spaced apart parallel relationship with each other. In an embodiment, the first axial spacer member 162 is attached to the inboard wall portion 78 and the second axial spacer member 164 is attached to the outboard wall portion 40. The rotating portion 22 is positioned between the axial spacer members 162, 164. In certain embodiments, the axial spacer members 162, 164 are provided on opposite sides of the rotating portion 22 so that the first axial spacer member 162 faces the inboard facing surface 106 of the rotating portion 22 and the second axial spacer member 164 faces the outboard facing surface 108 of the rotating portion 22. The axial spacer members 162, 164 limit the axial movement of the rotating portion 22 relative to the non-rotating portion 24. To limit the axial movement of the rotating portion 22 relative to the non-rotating portion 24, each axial spacer member 162, 164 is provided adjacent an annular sealing member 94, 96. Also, each axial spacer member 162, 164 is positioned radially between an annular air seal members 140, 142 and an outer annular seal members 154, 156 so as to separate one of the annular air seal members 140, 142 from one of the outer annular seal members.

When air pressure is applied to either air passage 58, 86, a space 165 between the rotating portion 22 and the non-rotating portion 24 is pressurized. The pressure is applied to the inner surfaces of each air seal member 140, 142 directing a portion 166, 168 of each seal member toward the rotating portion 22 and increasing a sealing effect between the seal members 140, 142 and the rotating portion 22. Since the air seal members 140, 142 engage and sealingly contact the rotating portion 22 in an axial direction, the rotating portion 22 may move radially with respect to the non-rotating portion 24 in a direction transverse to the axis of rotation 32. To limit the radial movement of the rotating portion 22, a second spacer member 170 is attached to non-rotating portion 24. The first spacer member 110 is provided radially out from the second spacer member 170. Contact between the first spacer member 110 and the second spacer member 170 limits the radial movement of the rotating portion 22 relative to the non-rotating portion 24.

The second spacer member 170 may be formed in a unitary manner with the axially extending portion 112 of the inboard wall portion 78. However, in other embodiments, the second spacer member 170 is secured to the axially extending portion 112 of the inboard wall portion in another manner. The second spacer member 170 extends radially from the inboard wall portion 78 toward the first spacer member 110. In an embodiment, the second spacer member 170 is an annular member. In this embodiment and when the first spacer member 110 is annular, the first spacer member 110 is provided with an inner diameter 172 that is greater than an outer diameter 174 of the second spacer member. The second spacer member 170 also extends axially from the inboard wall portion 78 toward the radially extending portion 114 of the outboard wall portion 40. A space 176 separates the second spacer member 170 from the inboard surface 118 of the radially extending portion 114.

The spacer members 110, 170 may comprise a wear resistant, low friction material to reduce friction between each other and the rotating portion 22 and the non-rotating portion 24. Alternatively, as is illustrated, a layer 178 of wear resistant, low friction material may be disposed between the spacer members 110, 170. The layer 178 can be bonded or otherwise attached to one of the spacer members 110, 170. Suitable wear resistant, low friction materials include plastics such as, for example, a PTFE loaded thermoplastic and other like materials.

In accordance with the provisions of the patent statutes, the present invention has been described in what is considered to represent its preferred embodiments. However, it should be noted that the invention can be practiced otherwise than as specifically illustrated and described without departing from its spirit or scope.

The invention claimed is:

1. A rotary joint assembly, comprising:
   a rotating portion which comprises an annular body and a pair of annular sealing members, each annular sealing member of the pair of annular sealing members is attached to a side of the annular body, and an air passageway is formed in the annular body;
   a non-rotating portion having a non-rotating portion air passageway formed therein, the non-rotating portion air passageway being in fluid communication with the air passageway formed in the annular body; and
   a pair of annular air seal members provided between the rotating portion and the non-rotating portion, wherein each annular air seal member of the pair of annular air seal members contacts a sealing surface of one of the annular sealing members to provide a seal around an interface between the air passageway formed in the annular body and the non-rotating portion air passageway.

2. The rotary joint assembly according to claim 1, wherein the annular body is thicker around opposite ends of the air passageway formed therein.

3. The rotary joint assembly according to claim 1, wherein the air passageway formed in the annular body is in a perpendicular relationship with an axis of rotation of the rotary joint assembly.

4. The rotary joint assembly according to claim 1, wherein the annular sealing members are attached to opposite sides of the annular body and disposed in separate grooves formed in the annular body.

5. The rotary joint assembly according to claim 1, wherein the annular air seal members are disposed in separate grooves formed in the non-rotating portion.

6. The rotary joint assembly according to claim 1, wherein the non-rotating portion air passageway is stationary with respect to the air passageway formed in the annular body and comprises a first portion, which is of a generally cylindrical shape, and a second portion, which is annular.

7. The rotary joint assembly according to claim 1, wherein the rotary joint assembly further comprises a central opening, is generally annular and is positioned around a portion of a hub so as to separate a hub flange from a knuckle ring.

8. The rotary joint assembly according to claim 7, wherein the rotary joint assembly is attached to the hub flange via a torque plate and one or more hub fasteners.

9. The rotary joint assembly according to claim 8, wherein the torque plate comprises an axially extending portion having an air passageway aperture formed therein, the air passageway aperture being aligned with the air passageway formed in the annular body.

10. The rotary joint assembly according to claim 7, wherein the rotary joint assembly is attached to the knuckle ring via a mounting plate, a generally ring-shaped member, and one or more fasteners.

11. The rotary joint assembly according to claim 1, wherein the non-rotating portion comprises an outboard wall portion and an inboard wall portion, wherein the outboard wall portion and the inboard wall portion each comprise a radially extending portion, the radially extending portion of the outboard wall portion being in a spaced apart parallel relationship with the radially extending portion of the inboard wall portion and the rotating portion being disposed between the radially extending portions.

12. The rotary joint assembly according to claim 11, wherein the outboard wall portion and the inboard wall portion each comprise an axial extending portion and the axial extending portion of the inboard wall portion overlaps the axially extending portion of the outboard wall portion so that the axial extending portion of the inboard wall portion is provided radially out from the axial extending portion of the outboard wall portion.

13. The rotary joint assembly according to claim 11, wherein the rotary joint assembly comprises a central opening and the central opening is at least partially defined by a portion of the outboard wall portion.

14. The rotary joint assembly according to claim 1, further comprising a pair of outer annular seal members provided between the rotating portion and the non-rotating portion, wherein each outer annular seal member of the pair of outer annular seal members is positioned radially between one of the annular air seal members and an outer end of the rotating portion.

15. The rotary joint assembly according to claim 14, wherein the non-rotating portion comprises an outboard wall portion and an inboard wall portion and an axial spacer member is attached to each of the outboard wall portion and the inboard wall portion to limit the axial movement of the rotating portion relative to the non-rotating portion, the axial spacer members being provided in a spaced apart parallel relationship with each other and each axial spacer member is positioned radially between one of the annular air seal members and one of the outer annular seal members.

16. The rotary joint assembly according to claim 1, further comprising a first spacer member formed in a unitary manner with the annular body, the first spacer member extending radially from the annular body toward an axially extending portion of the non-rotating portion and a second spacer member, the second spacer member being secured to the axially extending portion of the non-rotating portion.

17. The rotary joint assembly according to claim 16, wherein the first spacer member and the second spacer member are both annular members.

18. A rotary joint assembly for a steerable axle, comprising:
    a rotating portion attached to a hub flange via a torque plate, the rotating portion comprises an annular body and a pair of annular sealing members, each annular sealing member of the pair of annular sealing members is attached to a side of the annular body, and an air passageway is formed in the annular body;
    a non-rotating portion attached to a knuckle flange, the non-rotating portion having a non-rotating portion air passageway formed therein, the non-rotating portion air passageway being in fluid communication with the air passageway formed in the annular body;
    a pair of annular air seal members provided between the rotating portion and the non-rotating portion, wherein each annular air seal member of the pair of annular air seal members contacts a sealing surface of one of the annular sealing members to provide a seal around an interface between the air passageway formed in the annular body and the non-rotating portion air passageway;
    a pair of outer annular seal members provided between the rotating portion and the non-rotating portion, wherein each of the outer annular seal members of the pair of outer annular seal members is positioned radially between one of the annular air seal members and an outer end of the rotating portion and contacts the sealing surface of one of the annular sealing members; and
    a pair of axial spacer members provided between the rotating portion and the non-rotating portion, the axial spacer members being provided on opposite sides of the rotating portion and each axial spacer member of the pair of axial spacer members separates one of the annular air seal members from one of the outer annular seal members.

19. The rotary joint assembly according to claim 18, further comprising a first annular spacer member formed in a unitary manner with the annular body, the first annular spacer member extending radially from the annular body toward an axially extending portion of the non-rotating portion and a second annular spacer member, the second annular spacer member secured to the axially extending portion and extending radially therefrom toward the first annular spacer member, wherein the first annular spacer member is disposed around the second annular spacer member to limit radial movement of the rotating portion relative to the non-rotating portion.

20. The rotary joint assembly according to claim 18, wherein the rotary joint assembly is positioned around a portion of a hub and separates the hub flange from a knuckle ring.

* * * * *